United States Patent [19]

Forster

[11] Patent Number: 5,234,625

[45] Date of Patent: Aug. 10, 1993

[54] SYNTHESIS OF LEAD-ACTIVATED BARIUM SILICATE PHOSPHOR

[75] Inventor: Cheryl M. Forster, Van Etten, N.Y.

[73] Assignee: GTE Products Corp., Stamford, Conn.

[21] Appl. No.: 919,670

[22] Filed: Jul. 27, 1992

[51] Int. Cl.⁵ .............................................. C09K 11/59
[52] U.S. Cl. .............................................. 252/301.4 F
[58] Field of Search .................................. 252/301.4 F

[56] References Cited

U.S. PATENT DOCUMENTS

| | | | |
|---|---|---|---|
| 2,587,592 | 3/1952 | Butler | 252/301.4 F |
| 2,597,631 | 5/1952 | Froelich | 252/301.4 F |
| 3,043,781 | 7/1962 | Mooney | 252/301.4 F |

Primary Examiner—Jack Cooper
Attorney, Agent, or Firm—Elizabeth A. Levy

[57] ABSTRACT

A method of making lead-activated barium silicate phosphor involves the use of a lead source which is not lead oxide. More particularly, the lead source may be lead silicate or lead carbonate-lead hydroxide.

5 Claims, No Drawings

SYNTHESIS OF LEAD-ACTIVATED BARIUM SILICATE PHOSPHOR

TECHNICAL FIELD

This invention relates to methods of making fluorescent lamp phosphors and more particularly to methods of making lead-activated barium silicate phosphors.

BACKGROUND ART

Lead-activated barium silicate phosphors are described in U.S. Pat. Nos. 2,499,307, 2,597,631, 3,043,781, 3,984,346, 3,987,331, 4,147,816, and 4,691,140.

The lead source used in prior art methods of making lead-activated barium silicate phosphors is generally lead oxide. Because lead oxide has a relatively high vapor pressure, it partially volatilizes at the temperature at which the barium silicate phosphor is formed. As a result, approximately two-thirds of the initial amount of lead provided as lead oxide is lost to the environment before it can be integrated into the phosphor. Substantial excesses of lead oxide must therefore be used to provide sufficient lead in the phosphor.

SUMMARY OF THE INVENTION

We have determined that if a lead source which is not lead oxide is used in the synthesis of lead-activated barium silicate phosphor, the amount of lead that must be added during synthesis of the phosphor is decreased. As a result, less lead is released into the environment. Decreased lead loss during synthesis of a lead-containing phosphor is desirable from both an environmental and an economic standpoint.

Sources of lead other than lead oxide may decompose to form lead oxide before the lead from such sources is incorporated into the phosphor. However, any sources of lead which are not initially in the form of lead oxide are usable in the method of this invention, regardless of whether they decompose to lead oxide.

It is therefore an object of this invention to obviate the disadvantages of the prior art.

It is another object of this invention to enhance methods of making lead-activated barium silicate phosphors.

It is another object of this invention to decrease lead loss during the synthesis of lead-activated barium silicate phosphors.

It is another object of this invention to reduce the amount of lead released into the environment during the synthesis of lead-activated barium silicate phosphors.

These objects are accomplished, in one aspect of the invention, by a method of making lead-activated barium silicate phosphor, which comprises: combining a predetermined amount of a silica precursor, a barium precursor, a first flux material and lead silicate to form a first uniform mixture. This first uniform mixture is then fired to form a phosphor. The phosphor may optionally be further milled with a second flux material to form a second uniform mixture. The second mixture is then fired to obtain a lead-activated barium silicate phosphor.

In another aspect of the invention, there is provided a method for making lead-activated barium silicate phosphor, which comprises: combining a predetermined amount of a silica precursor, a barium precursor, a first flux material and lead carbonate-lead hydroxide to form a first uniform mixture. This first uniform mixture is then fired to form a phosphor. The phosphor may optionally be further milled with second flux material to form a second uniform mixture. The second mixture is then fired to obtain a lead-activated barium silicate phosphor.

BEST MODE FOR CARRYING OUT THE INVENTION

For a better understanding of the present invention, together with other and further objects, advantages and capabilities thereof, reference is made to the following specification and appended claims.

The use of a lead source which is not lead oxide, such as, for example, lead silicate or lead carbonate-lead hydroxide, produces a lead-activated barium silicate phosphor which is comparable in performance to lead-activated barium silicate phosphors produced with lead oxide. Additionally, the use of a lead source which is not lead oxide results in decreased lead loss during synthesis of the phosphor.

To prepare the phosphor, the raw materials, including a first flux material, are combined to form a un form mixture. Reactivity of the raw materials is enhanced if they are combined in an aqueous solution and heated. The mixture is then dried and fired to obtain the phosphor. To improve brightness, the fired phosphor is milled with a second flux material and then refired in air.

First firing temperatures may range from 750° C. to 990° C. Second firing temperatures may range from 900° C. to 1200° C. Firing times may range from 3 to 7 hours.

The following example illustrates the prior art method in which lead oxide is used as the source of lead.

EXAMPLE I: LEAD OXIDE (PRIOR ART)

The following raw materials were combined in 2 liters of deionized water in the following proportions:

| | |
|---|---|
| $SiO_2$ | 841.1 g |
| $BaCO_3$ | 187.8 g |
| $BaF_2$ | 7.71 g |
| $PbO$ | 7.37 g |

The solution was stirred and heated to 70° C. for 2 hours. The resulting precipitate was filtered and dried in a drying oven at 115° C. overnight. The dried material was ground with glass milling media and fired in air at 940° C. for 5 hours. The resulting phosphor was cooled and then milled for 30 minutes with 4 weight percent barium chloride. The milled material was then fired at 1050° C. for 4.5 hours. The resulting twice-fired phosphor was then washed in water, wet milled to remove agglomerates, filtered, dried and screened.

The following non-limiting examples are presented.

EXAMPLE II: LEAD SILICATE

The procedure of Example I was followed using the following proportions of raw materials:

| | |
|---|---|
| $SiO_2$ | 829.0 g |
| $BaCO_3$ | 187.8 g |
| $BaF_2$ | 7.71 g |
| $PbSiO_3$ | 9.35 g |

EXAMPLE III: LEAD SILICATE

The procedure of Example I was followed using the following proportions of raw materials:

| | |
|---|---|
| $SiO_2$ | 833.1 g |
| $BaCO_3$ | 187.8 g |
| $BaF_2$ | 7.71 g |
| $Pb_2SiO_4$ | 8.36 g |

EXAMPLE IV: LEAD SILICATE

The procedure of Example I was followed using the following proportions of raw materials:

| | |
|---|---|
| $SiO_2$ | 833.1 g |
| $BaCO_3$ | 187.8 g |
| $BaF_2$ | 7.71 g |
| $Pb_3Si_2O_7$ | 8.69 g |

EXAMPLE V: LEAD CARBONATE-LEAD HYDROXIDE

The procedure of Example I was followed using the following proportions of raw materials:

| | |
|---|---|
| $SiO_2$ | 41.1 g |
| $BaCO_3$ | 87.8 g |
| $BaF_2$ | 7.71 g |
| $2PbCO_3 \cdot Pb(OH)_2$ | 8.53 g |

Preferred forms of lead silicate include $PbSiO_3$, $Pb_2SiO_4$, and $Pb_3Si_2O_7$. The first two forms of lead silicate may be made by firing stoichiometric amounts of lead oxide and silicicate at 660° C. for three hours. The latter form of lead silicate may be obtained from Hammond Lead Products, Inc. (Pittsburgh, PA). Lead carbonate-lead hydroxide has the formula $2PbCO_3 \cdot Pb(OH)_2$ and may be obtained from Hammond Lead Products, Inc. Lead oxide is available from Performance Chemicals and Reagents, Inc. (Easton, PA). Any of the above-identified sources of lead may be provided in an amount ranging from 0.006 mole to 0.06 mole per mole of barium.

Any silica precursors, such as silicic acid, may be used, although best results are obtained when the silica precursor is fine particle size fumed silica, either dry or dispersed in an aqueous medium. Fumed silica is available from Cabot Chemical Corp. (Tuscola, IL). Silicic acid is available from Mallinckrodt Chemicals, Inc. (St. Louis, MO). The silica precursor may be provided in amounts ranging from 2.0 moles to 2.3 moles per mole of barium.

Any barium precursor may be used, although best results are obtained when the barium precursor is barium carbonate. Barium carbonate may be obtained from Aldrich Chemical Company (Milwaukee, WI).

Any flux material which promotes reactivity may be used. Preferred flux materials are barium halides, such as barium fluoride and barium chloride. Reagent grade barium fluoride may be obtained from Barium and Chemicals, Inc. (Steubenville, OH). Reagent grade barium chloride may be obtained from J. T. Baker Chemical Co. (Phillipsburg, NJ). Barium fluoride is the preferred first flux material (added prior to the first firing step) and may be provided in an amount of at least 0.044 mole per mole of barium. Barium chloride is the preferred second flux material (added after the first firing step) and may be provided in an amount ranging from 2 to 6 weight percent of the fired phosphor. The preferred amount of barium chloride is 4 weight percent.

While there have been shown what are at present considered to be the preferred embodiments of the invention, it will be apparent to those skilled in the art that various changes and modifications can be made herein without departing from the scope of the invention as defined by the appended claims.

We claim:

1. A method of making lead-activated barium silicate phosphor having the formula $BaSi_2O_5:Pb$, comprising the steps of: combining a silica precursor, a barium precursor, a barium halide flux material, and lead silicate to form a uniform mixture, and firing said uniform mixture at between 750° C. and 990° C. for between 3 and 7 hours in air to form said phosphor.

2. A method as in claim 1 further comprising the step of milling said phosphor with a second barium halide flux material to form a second uniform mixture, and firing said second uniform mixture at between 900° C. and 1200° C. for between 3 and 7 hours in air.

3. A method as in claim 2 wherein said second flux material is barium chloride and is provided in an amount of between 2 and 6 weight percent of said phosphor.

4. A method as in claim 1 wherein said silica precursor is fumed silica, said barium precursor is barium carbonate, and said flux material is barium fluoride provided in an amount of 0.044 mole per mole of barium.

5. A method as in claim 1 wherein said lead silicate is selected from the group consisting of $PbSiO_3$, $Pb_2SiO_4$, and $Pb_3Si_2O_7$ and is provided in an amount of between 0.006 and 0.06 mole per mole of barium.

* * * * *